Jan. 15, 1929.
I. J. ARONS
1,699,089
SIGNAL FOR COOKING UTENSILS
Filed Aug. 15, 1928
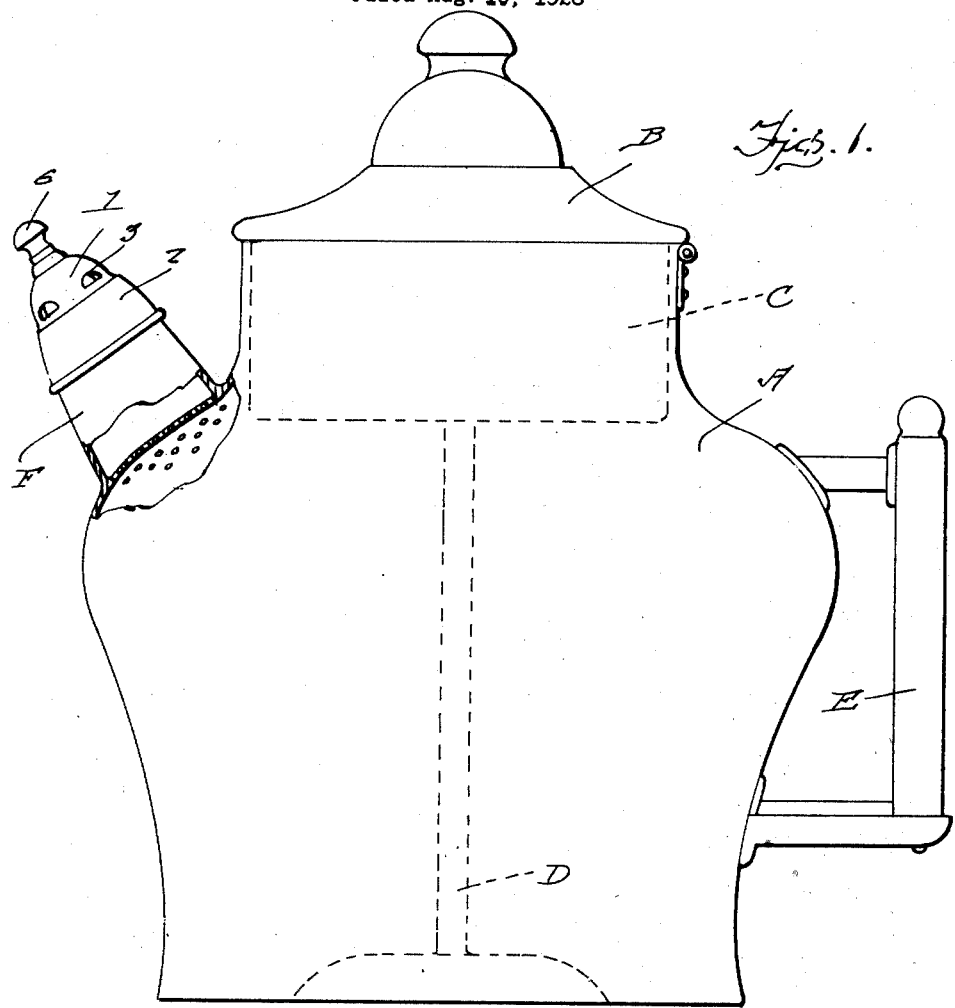
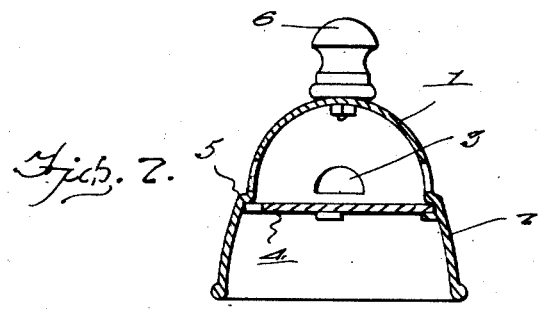
Inventor
*Isaac J. Arons.*
By *Clarence A. O'Brien*
Attorney Patented Jan. 15, 1929.

1,699,089

UNITED STATES PATENT OFFICE.

ISAAC J. ARONS, OF NEW YORK, N. Y.

SIGNAL FOR COOKING UTENSILS.

Application filed August 15, 1928. Serial No. 299,721.

This invention relates to new and useful improvements in cooking utensils, and the same relates more particularly to signal means for cooking utensils of the type employing spouts, through which the contents of the utensil is normally poured. The invention aims to eliminate the usual boiling over of the contents of the kettle, coffee pot or the like, which usually results in the extinguishing of the fire.

The prime object of the invention resides in the provision of a novel signal for cooking utensils operable at a predetermined pressure developed within the utensil, thus warning the attendant that the contents have reached a certain stage in the cooking period, so that the fire may be lowered to prevent boiling over of the contents.

Another important object of the invention is to provide a signal for cooking utensils in the form of a cap which can be easily slipped over the usual spout and which, because of its simplicity of construction, can be manufactured at a very low cost.

After considering the following specification and claim, other important objects and advantages of the invention will become apparent.

In the drawings:

Figure 1 is a front elevational view of a conventional coffee pot of the percolating type, in partial sectional view, and showing the present invention associated with the spout thereof, and Figure 2 is a longitudinal sectional view through the signal structure.

Referring to the drawings in detail, wherein like numerals designate like parts, a coffee pot A of generally conventional construction is provided with the usual hinged lid B, and the coffee retainer C supported within the pot upon the usual hollow stem D. The pot is also provided with a suitable handle E, and the spout F is preferably shorter than the usual coffee pot spout and this length may be attained by severing the usual spout at a point adjacent the body of the pot, provided the spout communicates with the pot at a point adjacent the top thereof.

In carrying out the present invention, a signal is provided in the form of a cap for disposition over the open end of the spout F, and this structure consists of a dome shaped body 1, provided with an annular skirt 2. The dome 1 is provided with a plurality of circumferentially spaced openings 3, while the skirt 2 is preferably flared to permit the same to be wedged over the spout F. The plate 4 is arranged transversely within the cap and is formed with an opening 5, in its edge. A knob 6 is secured externally to the central portion of the dome 1 to facilitate the engagement or disengagement of the cap with respect to the spout F.

Obviously, when the dome is properly disposed over the open end of the spout F and the pressure within the utensil has reached a certain degree, the escapement thereof through the opening 5 will produce a sound 1, as the same emits through the openings 3. This serves as a signal to warn the person attending the utensil that the contents thereof has reached a predetermined stage in its cooking period.

It is to be understood that certain changes in the specific shape, size and materials may be resorted to without departing from the spirit of the invention or the scope of the appended claim.

Having thus described my invention, what I claim as new is:

In a cooking utensil of the character employing a spout, a cap for said spout, and signal means on said cap operable at a predetermined pressure developed within the utensil, said cap consisting in construction of a dome shaped hollow body provided with a skirt adapted to engage over the spout, and a plate arranged within the body and having a by-pass, said body being formed with an opening through which the pressure escapes.

In testimony whereof I affix my signature.

ISAAC J. ARONS.